(12) United States Patent
Guo et al.

(10) Patent No.: US 12,544,542 B2
(45) Date of Patent: Feb. 10, 2026

(54) DEVELOPABLE INTERVENTIONAL GUIDEWIRE FOR HYPERPOLARIZED 129XE MAGNETIC RESONANCE IMAGING AND PREPARATION METHOD THEREOF

(71) Applicant: Innovation Academy for Precision Measurement Science and Technology, CAS, Wuhan (CN)

(72) Inventors: Qianni Guo, Wuhan (CN); Xinxin Yang, Wuhan (CN); Qingbin Zeng, Wuhan (CN); Xin Zhou, Wuhan (CN)

(73) Assignee: Innovation Academy for Precision Measurement Science and Technology, CAS, Wuhan (CN)

( * ) Notice: Subject to any disclaimer, the term of this patent is extended or adjusted under 35 U.S.C. 154(b) by 0 days.

(21) Appl. No.: 19/034,926

(22) Filed: Jan. 23, 2025

(65) Prior Publication Data
US 2025/0170370 A1   May 29, 2025

Related U.S. Application Data

(63) Continuation of application No. PCT/CN2023/079896, filed on Mar. 6, 2023.

(30) Foreign Application Priority Data

Sep. 26, 2022 (CN) ........................ 202211177539.5
Nov. 24, 2022 (CN) ........................ 202211486304.4

(51) Int. Cl.
*A61M 25/09* (2006.01)
*A61B 5/055* (2006.01)
(Continued)

(52) U.S. Cl.
CPC ............. *A61M 25/09* (2013.01); *A61B 5/055* (2013.01); *A61L 29/08* (2013.01); *A61L 29/085* (2013.01);
(Continued)

(58) Field of Classification Search
CPC ........ A61L 29/08; A61L 29/085; A61L 31/08; A61L 2420/02; A61L 31/10; A61L 29/02;
(Continued)

(56) References Cited

U.S. PATENT DOCUMENTS

2007/0259017 A1* 11/2007 Francis ................. A61L 31/146
424/423
2020/0345979 A1* 11/2020 Loh .................... A61M 25/0041

FOREIGN PATENT DOCUMENTS

CN         108578715 A      9/2018
CN         109577005 A      4/2019
(Continued)

OTHER PUBLICATIONS

Hyperpolarized 129Xe MRI of the Human Lung, John P. Mugler et al., Journal of Magnetic Resonance Imaging 37:313-331 (2013), Review: MR Physics for Clinicians (Year: 2013).*

(Continued)

Primary Examiner — Sean P Dougherty
(74) Attorney, Agent, or Firm — Nitin Kaushik (57) ABSTRACT

The present invention relates to the technical field of medical devices, and in particular, to a developable interventional guidewire for hyperpolarized $^{129}$Xe MRI and a preparation method thereof. The interventional guidewire includes a guidewire body, a cladding layer wrapped around a surface of the guidewire body, a Zn(II)-PDA modified layer adhered to a surface of the cladding layer, and a developing film layer coated on the Zn(II)-PDA modified layer. The Zn(II)-PDA modified layer is introduced on the guidewire body and, through activation treatment with 2-methylimidazole and solvothermal synthesis, a continuous and dense ZIF-8 film layer is prepared as the developing film layer for the hyperpolarized $^{129}$Xe MRI.

3 Claims, 10 Drawing Sheets

(51) Int. Cl.
    *A61L 29/08*     (2006.01)
    *A61L 31/08*     (2006.01)

(52) U.S. Cl.
    CPC ........... *A61L 31/08* (2013.01); *A61L 2420/02* (2013.01); *A61L 2420/08* (2013.01); *A61M 2025/09075* (2013.01); *A61M 2025/09108* (2013.01); *A61M 2025/09133* (2013.01)

(58) Field of Classification Search
    CPC ... A61L 29/106; A61L 2420/04; A61K 49/12; A61M 25/09; A61M 2025/09108
    See application file for complete search history.

(56) References Cited

FOREIGN PATENT DOCUMENTS

| | | |
|---|---|---|
| CN | 215135633 U | 12/2021 |
| CN | 114797499 A | 7/2022 |

OTHER PUBLICATIONS

Hyperpolarized Xe NMR signal advancement by metal-organic framework entrapment in aqueous solution, Qingbin Zeng et al., PNAS, 17558-17563, vol. 117, No. 30 (2020) (Year: 2020).*

* cited by examiner

DEVELOPABLE INTERVENTIONAL GUIDEWIRE FOR HYPERPOLARIZED 129XE MAGNETIC RESONANCE IMAGING AND PREPARATION METHOD THEREOF

CROSS-REFERENCE TO RELATED APPLICATIONS

The application claims priority to Chinese patent application No. 2022111775395, filed on Sep. 26, 2022 and Chinese patent application No. 2022114863044, filed on Nov. 24, 2022, the entire contents of which are incorporated herein by reference.

TECHNICAL FIELD

The present invention relates to the technical field of medical devices, and in particular, to a developable interventional guidewire for hyperpolarized $^{129}$Xe magnetic resonance imaging (MRI) and a preparation method thereof.

BACKGROUND

Image-guided interventional radiology is an interdisciplinary subject that integrates imaging diagnosis and clinical treatment, which uses various puncture needles, guidewires, catheters, and other interventional devices under the guidance and monitoring of imaging technology (including ultrasound, X-ray, CT, MRI, etc.) for diagnosis or treatment through percutaneous puncture. Compared with traditional surgical operations, image-guided surgical operations are less invasive, more effective, and less expensive with fewer complications. Compared with other medical imaging means such as CT, MRI has its unique advantages, such as higher safety, no radioactive damage to human bodies, significantly higher soft tissue density resolution than that of CT, and directly presenting three-dimensional images and cross-sectional images, thereby providing richer and more sufficient diagnostic information. The emergence of open magnetic resonance imaging systems and advances in rapid imaging technology have enabled the development of interventional magnetic resonance.

Hyperpolarized $^{129}$Xe MRI uses the spin-exchange optical pumping technology to increase the polarization of the noble gas $^{129}$Xe by 4-5 orders of magnitude, which greatly enhances the nuclear magnetic resonance (NMR) signal of $^{129}$Xe, thereby making hyperpolarized $^{129}$Xe MRI possible. Patients inhale hyperpolarized $^{129}$Xe by respiration. Since Xe is highly lipophilic, it can enter blood through the alveoli and then circulate throughout the body. When combined with patients' blood, tissues, and organs, it will produce NMR signals with different chemical shifts (at 197 ppm for lung tissues/plasma, and at 217 ppm for red blood cells, relative to gaseous $^{129}$Xe in the alveoli). Through computer data processing and image reconstruction, the NMR signals with different chemical shifts correspond to different colors, thereby enabling $^{129}$Xe MRI.

It should be noted that interventional MRI requires the use of a magnetically compatible interventional guidewire. A device with magnetic compatibility means that the device will neither be attracted and displaced by a strong magnetic field nor produce artifacts that affect interventional operations or electromagnetic induction effects that harm patients. According to the above requirements, existing materials that are magnetically compatible and can be used for interventional guidewires include nickel-aluminum alloy, metallic titanium, ceramics, plastics, etc. In addition, it is also necessary to solve the problem of visualization of interventional guidewires for hyperpolarized $^{129}$Xe MRI. Since the interventional guidewires do not combine with $^{129}$Xe, they produce no NMR signal under hyperpolarized $^{129}$Xe MRI, and their corresponding image information cannot be obtained. Therefore, there is an urgent need to design an interventional guidewire with a developing film layer for hyperpolarized $^{129}$Xe MRI to solve the problem of visualization of interventional guidewires for hyperpolarized $^{129}$Xe MRI and promote the development of the theory and practice of hyperpolarized $^{129}$Xe MRI-guided interventional therapy.

SUMMARY

In order to solve the technical problem of visualization of interventional guidewires for hyperpolarized $^{129}$Xe MRI-guided interventional diagnosis and treatment, the present invention provides a developable interventional guidewire for hyperpolarized $^{129}$Xe MRI and a preparation method thereof.

A continuous and dense ZIF-8 film is prepared on a cladding layer of the interventional guidewire to act as a developing film layer for the hyperpolarized $^{129}$Xe MRI, thereby enabling development of the interventional guidewire under the hyperpolarized $^{129}$Xe MRI. Through guidance of the interventional guidewire, the guidewire can be inserted and removed under hyperpolarized $^{129}$Xe gas MRI, which can improve the accuracy and success rate of guidewire insertion and removal in clinical practice and, most importantly, avoid radiation hazards to doctors or patients when DSA or CT devices are used for guidewire positioning in clinical practice.

To achieve the above objectives, a technical solution adopted by the present invention is as follows:

an application of a ZIF-8 film in a developable interventional guidewire for hyperpolarized $^{129}$Xe MRI.

A developable interventional guidewire for hyperpolarized $^{129}$Xe MRI, where the interventional guidewire includes a guidewire body, a cladding layer wrapped around a surface of the guidewire body, a Zn(II)-PDA modified layer adhered to a surface of the cladding layer, and a developing film layer coated on the Zn(II)-PDA modified layer; the guidewire body is a core wire with magnetic compatibility; and the developing film layer is a continuous and dense ZIF-8 film and visible under the hyperpolarized $^{129}$Xe MRI.

Furthermore, the guidewire body is made of nickel-aluminum alloy, metallic titanium, ceramics, plastics, or composite materials (such as fiberglass reinforced plastic rods).

Furthermore, the cladding layer is a layer of high molecular weight polymer such as polytetrafluoroethylene, polyurethane, nylon, polylactic acid, or polyether ether ketone; and the developing film layer is used to capture $^{129}$Xe gas molecules and generate an NMR signal of $^{129}$Xe@ZIF-8.

The present invention further provides a preparation method of the interventional guidewire described above, including the following steps:

(1) preparation of a Zn(II)-PDA modified layer: wrapping a cladding layer around a surface of a guidewire body to obtain a to-be-treated interventional guidewire; pre-adding $ZnCl_2$ into a dopamine-containing tris(hydroxymethyl)aminomethane hydrochloride buffer solution to obtain a zinc-doped dopamine coating solution; and immersing the clean to-be-treated interventional guidewire in the zinc-doped dopamine coating solution, stirring at room temperature for complete reaction (preferably, for 24 hours), and performing washing and drying to obtain the interventional guidewire with the Zn(II)-PDA modified layer;

(2) activation of the Zn(II)-PDA modified layer: immersing the interventional guidewire with the Zn(II)-PDA modified layer obtained in the step (1) in a methanol solution of 2-methylimidazole; and allowing for activation at 25-65° C. for more than 2 hours (preferably at 50° C. for 3 hours) to obtain an activated interventional guidewire; and (3) preparation of a ZIF-8 developing film layer: putting the activated interventional guidewire obtained in the step (2) into a hydrothermal autoclave; using 2-methylimidazole, zinc nitrate hexahydrate, and anhydrous methanol as raw materials to prepare a ZIF-8 synthetic solution; transferring the ZIF-8 synthetic solution to the hydrothermal autoclave and allowing for reaction at 65-120° C. for more than 24 hours (preferably at 85° C. for 24 hours); and after the reaction is completed, allowing for cooling to room temperature and performing washing and drying overnight (preferably at 60° C.) to obtain the developable interventional guidewire for hyperpolarized $^{129}$Xe MRI.

Furthermore, the dopamine-containing tris(hydroxymethyl)aminomethane hydrochloride buffer solution is prepared by dissolving dopamine hydrochloride in a tris(hydroxymethyl)aminomethane hydrochloride buffer solution with a pH of 8.55 and a concentration of 10 mM.

Furthermore, a mass ratio of the $ZnCl_2$ to the dopamine hydrochloride added in the step (1) is 2:1.

Furthermore, a concentration of the methanol solution of 2-methylimidazole in the step (2) is 1.5 M.

Furthermore, a molar ratio of the 2-methylimidazole to the zinc nitrate hexahydrate in the step (3) is 2:1.

The guidewire body of the interventional guidewire according to the present invention is made of materials with magnetic compatibility and meets the mechanical properties required for clinical operations, including high flexibility, stiffness, and bending and torsion transmission. The cladding layer of the interventional guidewire is made of materials with good biocompatibility.

Polydopamine formed by oxidative self-polymerization of dopamine under alkaline conditions has ultra-strong adhesion and can adhere tightly to the polytetrafluoroethylene cladding layer of the guidewire. The resulting Zn(II)-PDA coating contains a large number of Zn(II) clusters and Zn—O coordination bonds. These clusters can serve as a starting point for the nucleation and growth of ZIF-8 after 2-Methylimidazole activation treatment. Then, ZIF-8 crystal nuclei are preferentially formed inside the coating, thus inducing the rapid formation of the ZIF-8 film layer. The ZIF-8 film is difficult to directly adhere to and grow on the non-stick polytetrafluoroethylene surface, and also easy to fall off due to its weak binding force. The Zn(II)-PDA coating can act as an intermediate connecting layer, which can, on the one hand, better adhere to the polytetrafluoroethylene cladding layer and enhance the bonding force between the ZIF-8 film layer and the cladding layer and on the other hand, provide a large number of nucleation starting points for the ZIF-8 film, induce rapid crystal growth, and ultimately form a continuous and dense ZIF-8 developing film layer with superior performance.

ZIF-8 is a metal-organic framework (MOF) material formed by $Zn^{2+}$ coordinated with N atoms in a 2-methylimidazole ring, showing good loading capacity for $^{129}$Xe. The NMR signal intensity of $^{129}$Xe@ZIF-8 in an aqueous solution of ZIF-8 is stronger than that of dissolved $^{129}$Xe ($^{129}$Xe@$H_2O$).

ZIF-8 in the interventional guidewire prepared according to the present invention can capture $^{129}$Xe inhaled into a human body and generate an NMR signal of $^{129}$Xe@ZIF-8 to enable development of the interventional guidewire under hyperpolarized $^{129}$Xe MRI through computer data processing and image reconstruction, thereby improving the accuracy and success rate of guidewire insertion and removal in clinical practice;

meanwhile, it can provide a radiation-free imaging technology different from CT and DSA, and avoid radiation hazards to doctors or patients when CT or DSA-guided interventional guidewires are used in clinical practice.

The present invention has the following advantages and beneficial effects:

(1) the ZIF-8 developing film layer prepared according to the present invention is continuous and dense with a relatively uniform nanoparticle size and shows good loading capacity for hyperpolarized $^{129}$Xe; and (2) the ZIF-8 developing film layer according to the present invention can capture $^{129}$Xe molecules in complex biological systems and generate NMR signals and images of $^{129}$Xe@ZIF-8, thereby solving the problem of development of interventional guidewires for hyperpolarized $^{129}$Xe MRI and enabling hyperpolarized $^{129}$Xe MRI-guided interventional diagnosis and treatment without the hazard of ionizing radiation, showing a broad application prospect.

Reference signs in the accompanying drawings:
1. guidewire body; 2. polytetrafluoroethylene cladding layer; 3. Zn(II)-PDA modified layer; and 4. ZIF-8 developing film layer.

DETAILED DESCRIPTION OF THE EMBODIMENTS

The present invention will be further illustrated below in detail in conjunction with embodiments. It should be understood that these embodiments are only intended to illustrate the present invention rather than to limit the claimed scope of the present invention. It should also be understood that after reading the content of the present invention, those skilled in the art may make various modifications to the present invention, and these equivalent forms shall also fall within the scope defined by the appended claims of the present invention.

The technical solution of the present invention will be described in detail in conjunction with embodiments and with reference to FIGS. 1-8.

The sources of the main reagents and materials used in the following Embodiments 1-4 are as follows:

sodium hydroxide, zinc chloride, dopamine hydrochloride, zinc nitrate hexahydrate, 2-methylimidazole, and anhydrous methanol were purchased from Sinopharm, and tris(hydroxymethyl)aminomethane hydrochloride was purchased from Shanghai Aladdin, all of analytical grade.

Fetal bovine serum was of special grade produced in South America (HYCEZMBIO™).

Unless otherwise specified, the aforementioned reagents were used directly without further purification. All water used was deionized.

In order to verify the feasibility of the method of the present invention, the following Embodiment 1 used a fiberglass reinforced plastic rod with an inner diameter of 0.80 mm as a guidewire body and a polytetrafluoroethylene heat-shrink tube as a cladding layer wrapped around the surface of the fiberglass reinforced plastic rod to prepare a to-be-treated interventional guidewire.

The operation of wrapping the heat-shrink tube around the fiberglass reinforced plastic rod was carried out as follows:

slip the heat-shrink tube (HST-PTFE (1.7:1) type Teflon heat-shrink tube from Shenzhen Hongjiexin Technology Co., Ltd., with an inner diameter of 1.0-1.2 mm before heat shrinkage) on the fiberglass reinforced plastic rod with an inner diameter of 0.80 mm, use a hot air gun to retract the Teflon heat-shrink tube at a high temperature of 350° C., and then tightly wrap the tube around the outer surface of the fiberglass reinforced plastic rod. After heat shrinkage, the wall thickness of the heat-shrink tube became 0.14±0.03 mm.

Embodiment 1

A preparation method of a developable interventional guidewire for hyperpolarized $^{129}$Xe MRI, including the following steps:

(1) preparation of a Zn(II)-PDA modified layer: weigh 0.1592 g of tris(hydroxymethyl)aminomethane hydrochloride and add it into 100 mL of deionized water, and then stir the solution until complete dissolution; add 28 mg of sodium hydroxide powder to adjust the pH of the solution to obtain a tris(hydroxymethyl)aminomethane hydrochloride buffer solution with a concentration of 10 mM; add 0.2 g of dopamine hydrochloride to the tris(hydroxymethyl)aminomethane hydrochloride buffer solution, stir the solution until dissolution, and then add 0.4 g of zinc chloride to obtain a zinc-doped dopamine coating solution; cut the to-be-treated interventional guidewire into segments of 7 cm long, clean the segments ultrasonically with ethanol and deionized water for 15 minutes, immerse the cleaned interventional guidewire in the aforementioned zinc-doped dopamine coating solution, and then stir the solution and allow for reaction for 24 hours at room temperature in the presence of oxygen and away from light, with a rotation speed of 200 r/min; and after the reaction is completed, wash the interventional guidewire several times with deionized water and dry it in an oven at 65° C. for 12 hours to obtain an interventional guidewire with a Zn(II)-PDA modified layer;

(2) activation of the Zn(II)-PDA modified layer: weigh 1.2565 g of 2-methylimidazole powder and dissolve it in 10 mL of anhydrous methanol to obtain a methanol solution of 2-methylimidazole; immerse the interventional guidewire with the Zn(II)-PDA modified layer obtained in the step (1) in the methanol solution of 2-methylimidazole, and heat the solution for activation reaction in an oil bath at 50° C. for 3 hours; and then take out the interventional guidewire and wash away residual 2-methylimidazole with anhydrous methanol to obtain an activated interventional guidewire with the Zn(II)-PDA modified layer;

(3) preparation of a ZIF-8 developing film layer: put the activated interventional guidewire with the Zn(II)-PDA modified layer obtained in the step (2) into a 100 mL hydrothermal autoclave; add 2.36 g of zinc nitrate hexahydrate into a 250 ml conical flask, and then add 50 mL of anhydrous methanol into the flask; add 1.32 g of 2-methylimidazole into another 250 ml conical flask, and then add 50 mL of anhydrous methanol into the flask; sonicate the solutions in the two conical flasks until they are clear and transparent to obtain a 2-methylimidazole solution and a zinc nitrate solution respectively; add the 2-methylimidazole solution into the zinc nitrate solution while stirring, and wait until they are evenly mixed to obtain a ZIF-8 synthetic solution; transfer the ZIF-8 synthetic solution to the aforementioned autoclave, seal and place it in an electric blast drying oven at 85° C. for reaction for 24 hours, and after the reaction is completed, cool it to room temperature; and finally, take out the interventional guidewire, wash it several times with anhydrous methanol, and then dry it at 60° C. overnight to obtain an interventional guidewire with a ZIF-8 developing film layer on the surface thereof, that is, an interventional guidewire with a developing film layer for hyperpolarized $^{129}$Xe MRI;

(4) replacement of the aforementioned interventional guidewire activated with the Zn(II)-PDA modified layer in the step (3) with a to-be-treated interventional guidewire having gone through ultrasonic cleaning for 15 minutes to prepare an interventional guidewire without a Zn(II)-PDA modified layer and without activation; and (5) replacement of the aforementioned interventional guidewire activated with the Zn(II)-PDA modified layer in the step (3) with the interventional guidewire with the Zn(II)-PDA modified layer and without activation prepared in the step (1).

Figure 1:
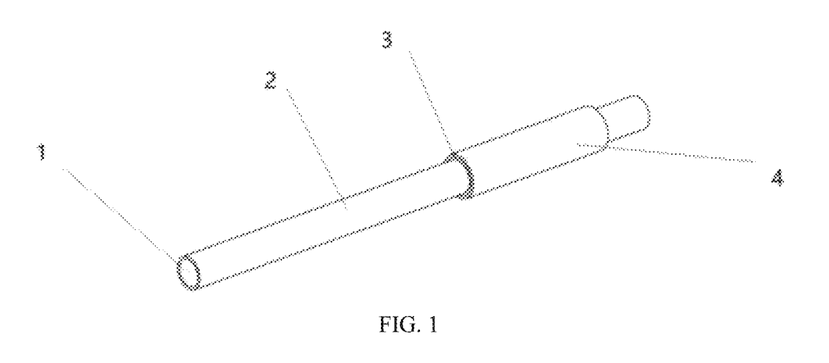
FIG. 1 shows a schematic structural diagram of an interventional guidewire with a ZIF-8 developing film layer prepared in a step (3) in an Embodiment 1 of the present invention.
Figure 2:
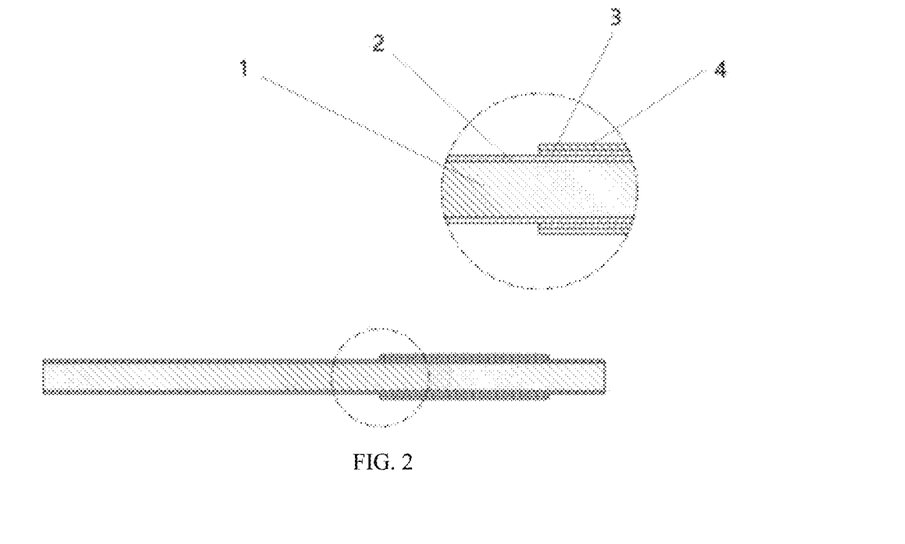
FIG. 2 shows a schematic cross-sectional diagram of an interventional guidewire with a ZIF-8 developing film layer prepared in the step (3) in the Embodiment 1 of the present invention.

FIGS. 1 and 2 show a schematic structural diagram and cross-sectional diagram of the interventional guidewire with the ZIF-8 developing film layer prepared in the step (3) in the Embodiment 1 of the present invention. The interventional guidewire had an inner diameter of 0.80 mm and included: a guidewire body 1, a polytetrafluoroethylene cladding layer 2, a Zn(II)-PDA modified layer 3, and a ZIF-8 developing film layer 4, where the developing film layer 4 was composed of ZIF-8 nanoparticles; the polytetrafluoroethylene cladding layer 2 was wrapped around the outer surface of the guidewire body 1; the Zn(II)-PDA modified layer 3 was coated on the surface of the polytetrafluoroethylene cladding layer 2; and the ZIF-8 developing film layer 4 was connected to the polytetrafluoroethylene cladding layer 2 via the Zn(II)-PDA modified layer 3 as an intermediate layer.

Figure 3A:
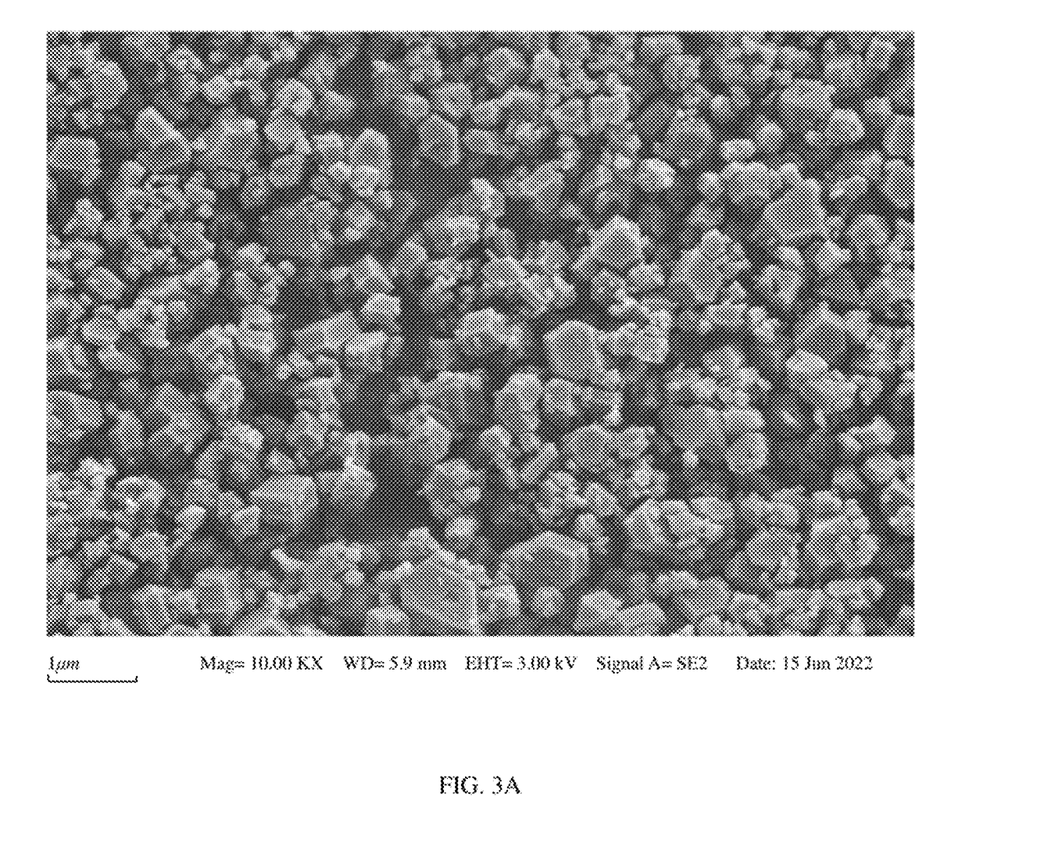
FIG. 3A shows a scanning electron micrograph of a ZIF-8 developing film layer on an interventional guidewire prepared in the step (3) in the Embodiment 1 of the present invention.
Figure 3B:
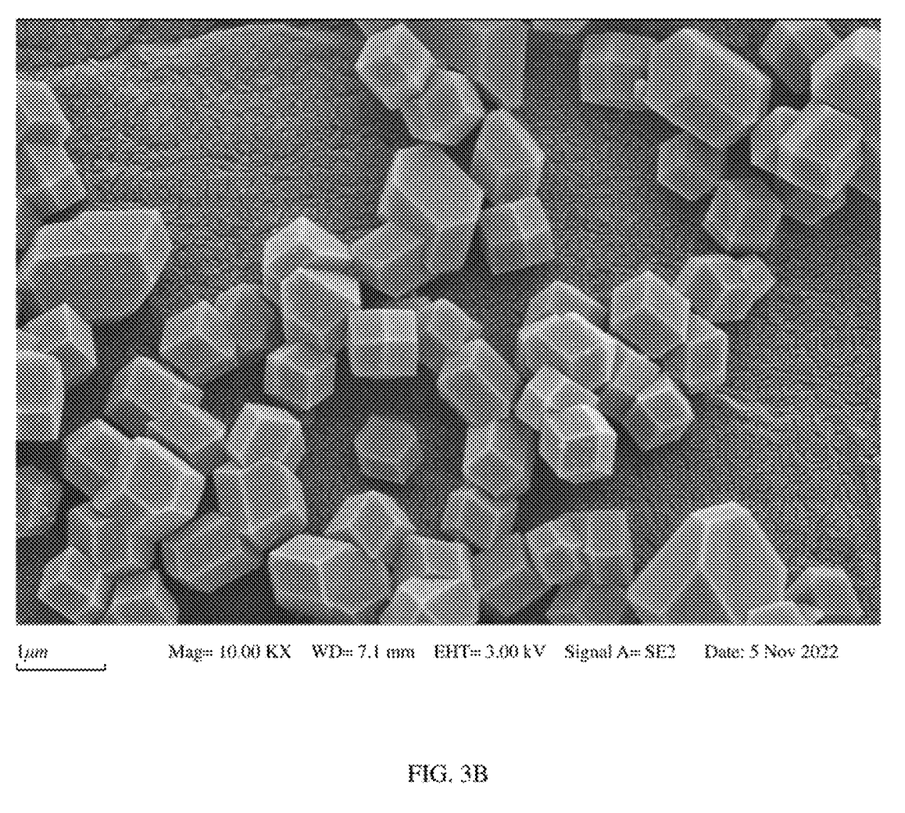
FIG. 3B shows a scanning electron micrograph of a ZIF-8 developing film layer on an interventional guidewire without a Zn(II)-PDA modified layer and without activation prepared in the Embodiment 1 of the present invention.
Figure 3C:
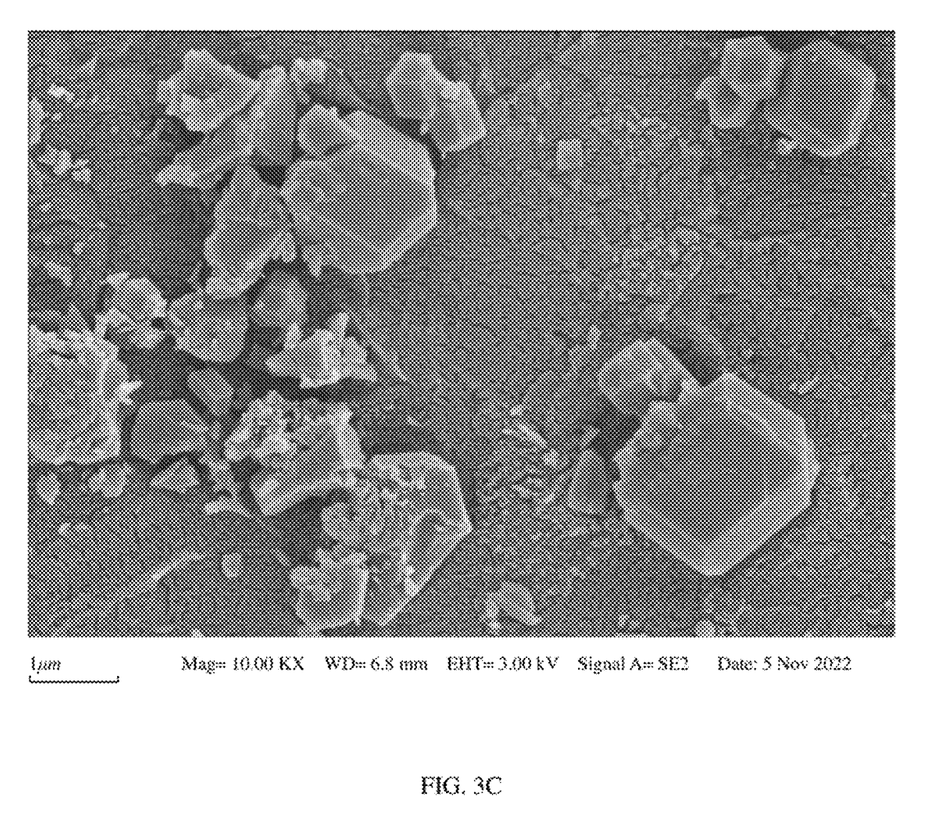
FIG. 3C shows a scanning electron micrograph of a ZIF-8 developing film layer on an interventional guidewire with a Zn(II)-PDA modified layer and without activation prepared in the Embodiment 1 of the present invention.

FIG. 3A shows a scanning electron micrograph of the ZIF-8 developing film layer 4 on the interventional guidewire prepared in the step (3) in this embodiment, from which it can be seen that ZIF-8 particles accumulate on the interventional guidewire to form a continuous and dense ZIF-8 film layer; FIG. 3B shows a scanning electron micrograph of the ZIF-8 developing film layer on the interventional guidewire without the Zn(II)-PDA modified layer and without activation prepared in this embodiment; and FIG. 3C shows a scanning electron micrograph of the ZIF-8 developing film layer on the interventional guidewire with the Zn(II)-PDA modified layer and without activation prepared in this embodiment. It can be seen form FIGS. 3b and 3c that only loosely accumulated ZIF-8 particles appear on the interventional guidewire, and no dense ZIF-8 film layer is formed. The experimental results of scanning electron microscopy shown in FIGS. 3a, 3b, and 3c prove that the lack of Zn(II)-PDA modified layer or the Zn(II)-PDA modified layer without activation cannot ensure the successful preparation of the ZIF-8 developing film layer on the surface of the guidewire, and the preparation and activation of the Zn(II)-PDA modified layer are the key to preparing a continuous and dense ZIF-8 developing film layer on the interventional guidewire.

Figure 4:
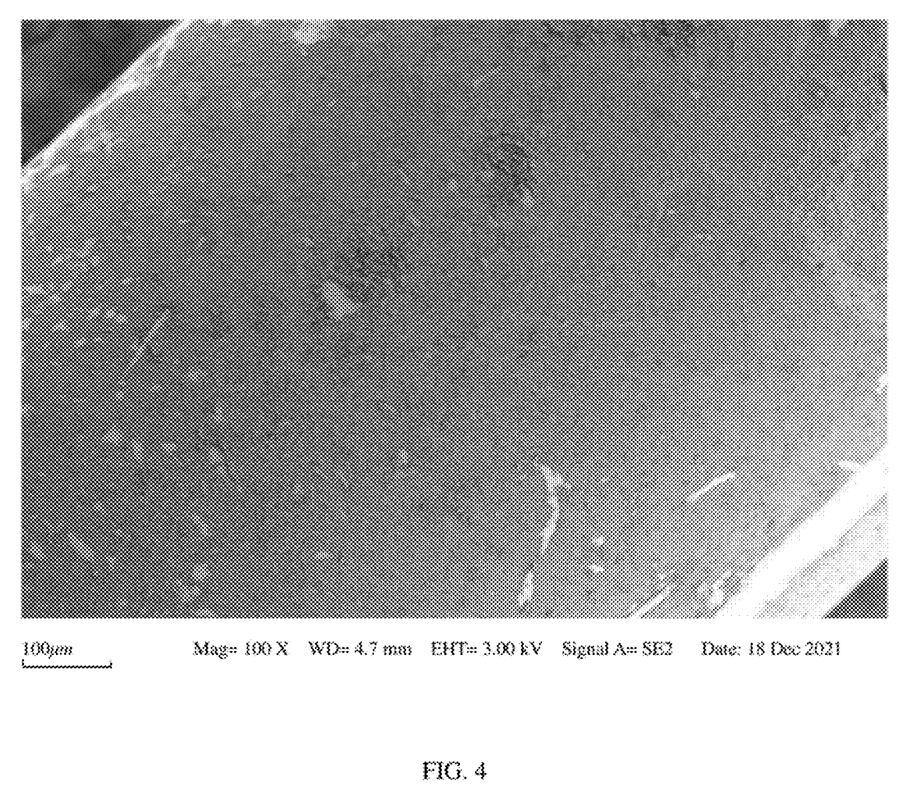
FIG. 4 shows a scanning electron micrograph of an interventional guidewire coated with a ZIF-8 developing film layer prepared in the step (3) in the Embodiment 1 of the present invention.
Figure 5:
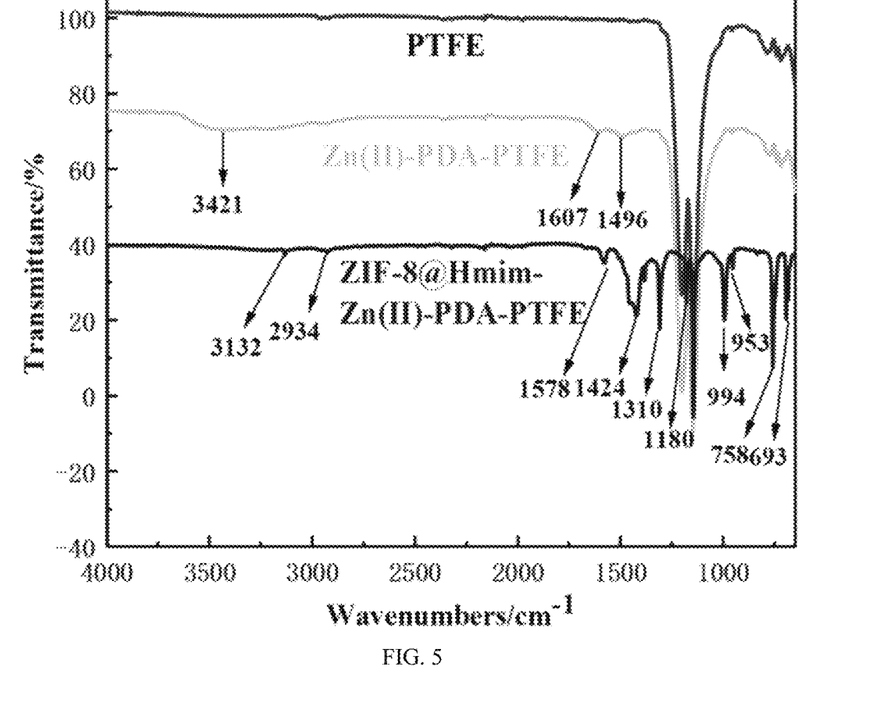
FIG. 5 shows attenuated total reflection infrared absorption spectra of a polytetrafluoroethylene cladding layer on an interventional guidewire prepared in a step (1), a Zn(II)-PDA modified layer prepared in a step (2), and a ZIF-8 developing film layer prepared in the step (3) in the Embodiment 1 of the present invention.

FIG. 4 shows a scanning electron micrograph of the interventional guidewire coated with the ZIF-8 developing film layer prepared in the step (3) in the Embodiment 1 of the present invention; and FIG. 5 shows attenuated total reflection infrared absorption spectra of the polytetrafluoroethylene cladding layer 2 on the interventional guidewire prepared in the step (1), the Zn(II)-PDA modified layer 3 prepared in the step (2), and the ZIF-8 developing film layer 4 prepared in the step (3) in the Embodiment 1 of the present invention. It can be seen from the figures that in addition to the infrared absorption peak of polytetrafluoroethylene, the characteristic absorption peaks of Zn(II)-PDA also appear near 1496 $cm^{-1}$, 1607 $cm^{-1}$, and 3421 $cm^{-1}$ in the infrared absorption spectrum of the Zn(II)-PDA modified layer on the interventional guidewire, which shows that the Zn(II)-PDA modified layer is successfully modified on the cladding layer of the interventional guidewire. In the infrared absorption spectrum of the ZIF-8 developing film layer on the interventional guidewire, the sharp peaks at 693 $cm^1$, 758 $cm^{-1}$, 953 $cm^{-1}$, 1180 $cm^{-1}$, and 1310 $cm^{-1}$ all belong to bending vibration peaks of the imidazole ring; the peaks at 1424 $cm^{-1}$ and 1457 $cm^{-1}$ are both stretching vibration peaks of the imidazole ring; the peaks at 994 $cm^{-1}$ and 1146 $cm^{-1}$ are characteristic stretching vibration peaks of C—N in imidazole; and the peak at 1578 $cm^{-1}$ is a characteristic stretching vibration peak of C=N in imidazole. These absorption peaks indicate that the ZIF-8 film layer is successfully modified on the polytetrafluoroethylene cladding layer of the interventional guidewire via the Zn(II)-PDA modified layer as a connecting layer.

The above results all indicate successful preparation of the ZIF-8 developing film layer.

Embodiment 2

A $^{129}Xe$ spectrum test of the interventional guidewire with the developing film layer for hyperpolarized $^{129}Xe$ MRI prepared in the Embodiment 1, obtained from direct gaseous sampling, which was carried out as follows:

perform a $^{129}Xe$ NMR experiment with a 400 MHz (9.4 T) Bruker AV400 wide-aperture spectrometer (Bruker Biospin, Ettlingen, Germany) equipped with a microimaging gradient coil, with an RF pulse frequency of the Xe core being 110.7 MHz; use a 10 mm dual resonance probe ($^{129}Xe$ and 1H, PABBO 400W1/S2 BB-HD-10Z) having a rectangular pulse with a flip angle of 90° for generating a $^{129}Xe$ NMR spectrum; generate a hyperpolarized $^{129}Xe$ gas by spin exchange optical pumping using a continuous flow polarization device, with a degree of nuclear spin polarization being approximately 20%; inject a mixed gas consisting of 10% $N_2$, 88% He and 2% Xe by volume (Xe may be 86% enriched $^{129}Xe$ or naturally abundant $^{129}Xe$, with the latter used in this embodiment) directly into a 10 mm nuclear magnetic tube for 20 seconds, and then wait for 3 seconds before signal acquisition; set the sample temperature to 300 K on the NMR spectrometer; and put the interventional guidewire of 7 cm long with the developing film layer for hyperpolarized $^{129}Xe$ MRI prepared in the step (3) in the Embodiment 1 into the nuclear magnetic tube for gas contact and directly perform the aforementioned $^{129}Xe$ NMR experiment.

Figure 6:
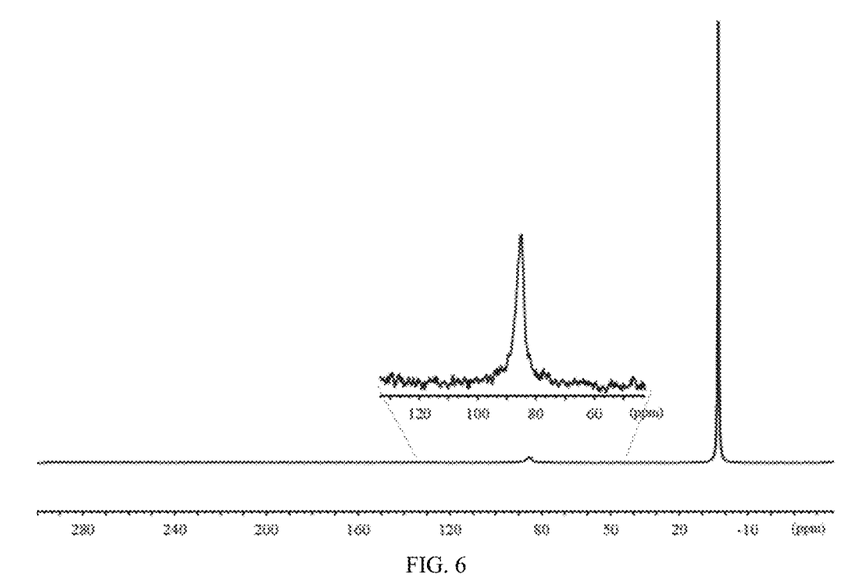
FIG. 6 shows a $^{129}$Xe spectrum of an interventional guidewire with a developing film layer for hyperpolarized $^{129}$Xe MRI prepared in an Embodiment 2, obtained from direct gaseous sampling.

The results of the $^{129}Xe$ spectrum of the interventional guidewire obtained through direct gaseous sampling in this embodiment are shown in FIG. 6. Two signals appeared in the $^{129}Xe$ spectrum: one was attributed to gaseous $^{129}Xe$, with the chemical shift δ=0 ppm, and the other at 85 ppm was what the applicant wanted to obtain, i.e. the NMR signal of $^{129}Xe@ZIF-8$ generated by the ZIF-8 developing film layer capturing $^{129}Xe$ molecules in the mixed gas. The above results indicate that the interventional guidewire modified with the developing film layer for hyperpolarized $^{129}Xe$ MRI can obtain the NMR signal of $^{129}Xe@ZIF-8$ under gaseous conditions.

Embodiment 3

A $^{129}Xe$ spectrum test of the interventional guidewire with the developing film layer for hyperpolarized $^{129}Xe$ MRI prepared in the Embodiment 1, obtained in an aqueous solution, which was carried out as follows:

perform a $^{129}Xe$ NMR experiment with a 400 MHz (9.4 T) Bruker AV400 wide-aperture spectrometer (Bruker Biospin, Ettlingen, Germany) equipped with a microimaging gradient coil, with an RF pulse frequency of the Xe core being 110.7 MHz; use a 10 mm dual resonance probe ($^{129}$Xe and 1H, PABBO 400W1/S2 BB-HD-10Z) having a rectangular pulse with a flip angle of 90° for generating a $^{129}$Xe NMR spectrum; generate a hyperpolarized $^{129}$Xe gas by spin exchange optical pumping using a continuous flow polarization device, with a degree of nuclear spin polarization being approximately 20%; inject a mixed gas consisting of 10% $N_2$, 88% He and 2% Xe by volume (Xe may be 86% enriched $^{129}$Xe or naturally abundant $^{129}$Xe, with the latter used in this embodiment) directly into a 10 mm nuclear magnetic tube for 20 seconds, and then wait for 3 seconds to ensure that any bubbles generated are completely collapsed before signal acquisition; set the sample temperature to 300 K on the NMR spectrometer; and put the interventional guidewire of 7 cm long with the developing film layer for hyperpolarized $^{129}$Xe MRI prepared in the step (3) in the Embodiment 1 into the nuclear magnetic tube, add 3 mL of deionized water, and perform the aforementioned $^{129}$Xe NMR experiment.

Figure 7:
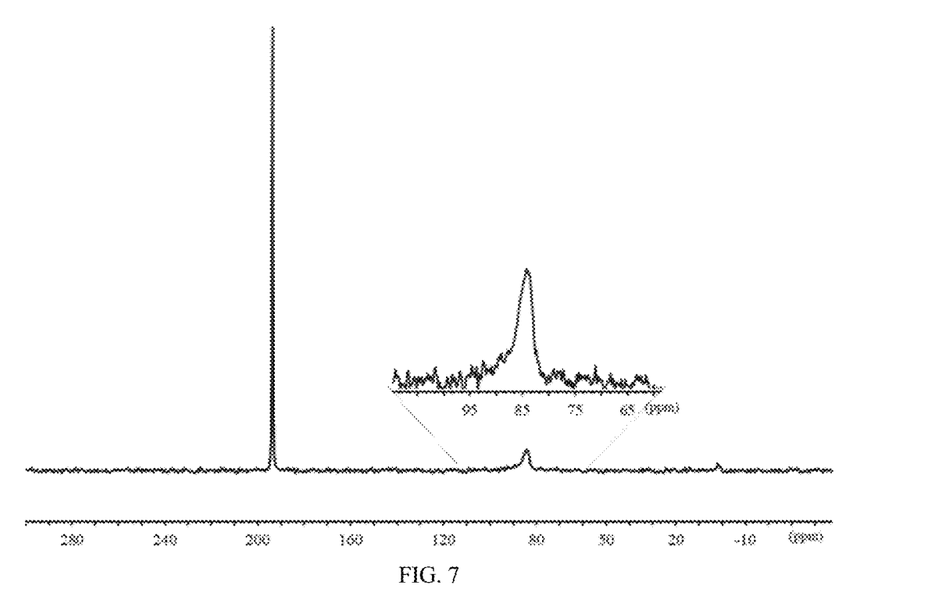
FIG. 7 shows a $^{129}$Xe spectrum of an interventional guidewire with a developing film layer for hyperpolarized $^{129}$Xe MRI prepared in an Embodiment 3, obtained in an aqueous solution.

The results of the $^{129}$Xe spectrum of the interventional guidewire in the aqueous solution in this embodiment are shown in FIG. 7. Two signals appeared in the $^{129}$Xe spectrum: one was attributed to dissolved $^{129}$Xe, with the chemical shift δ=193.5 ppm, and the other at 85 ppm was what the applicant wanted to obtain, i.e. the NMR signal of $^{129}$Xe@ZIF-8 generated by the ZIF-8 developing film layer capturing $^{129}$Xe molecules in the aqueous solution. The above results indicate that the interventional guidewire modified with the developing film layer for hyperpolarized $^{129}$Xe MRI can obtain the NMR signal of $^{129}$Xe@ZIF-8 in the aqueous solution.

Embodiment 4

A $^{129}$Xe spectrum test of the interventional guidewire with the developing film layer for hyperpolarized $^{129}$Xe MRI prepared in the Embodiment 1, obtained in fetal bovine serum, which was carried out as follows:

perform a $^{129}$Xe NMR experiment with a 400 MHz (9.4 T) Bruker AV400 wide-aperture spectrometer (Bruker Biospin, Ettlingen, Germany) equipped with a microimaging gradient coil, with an RF pulse frequency of the Xe core being 110.7 MHz; use a 10 mm dual resonance probe ($^{129}$Xe and 1H, PABBO 400W1/S2 BB-HD-10Z) having a rectangular pulse with a flip angle of 90° for generating a $^{129}$Xe NMR spectrum; generate a hyperpolarized $^{129}$Xe gas by spin exchange optical pumping using a continuous flow polarization device, with a degree of nuclear spin polarization being approximately 20%; inject a mixed gas consisting of 10% $N_2$, 88% He and 2% Xe by volume (Xe may be 86% enriched $^{129}$Xe or naturally abundant $^{129}$Xe, with the latter used in this embodiment) directly into a 10 mm nuclear magnetic tube for 20 seconds, and then wait for 3 seconds to ensure that any bubbles generated are completely collapsed before signal acquisition; set the sample temperature to 300 K on the NMR spectrometer; and put the interventional guidewire of 7 cm long with the developing film layer for hyperpolarized $^{129}$Xe MRI prepared in the step (3) in the Embodiment 1 into the nuclear magnetic tube, add 0.6 mL of fetal calf serum and 2.4 mL of deionized water, and perform the aforementioned $^{129}$Xe NMR experiment.

Figure 8:
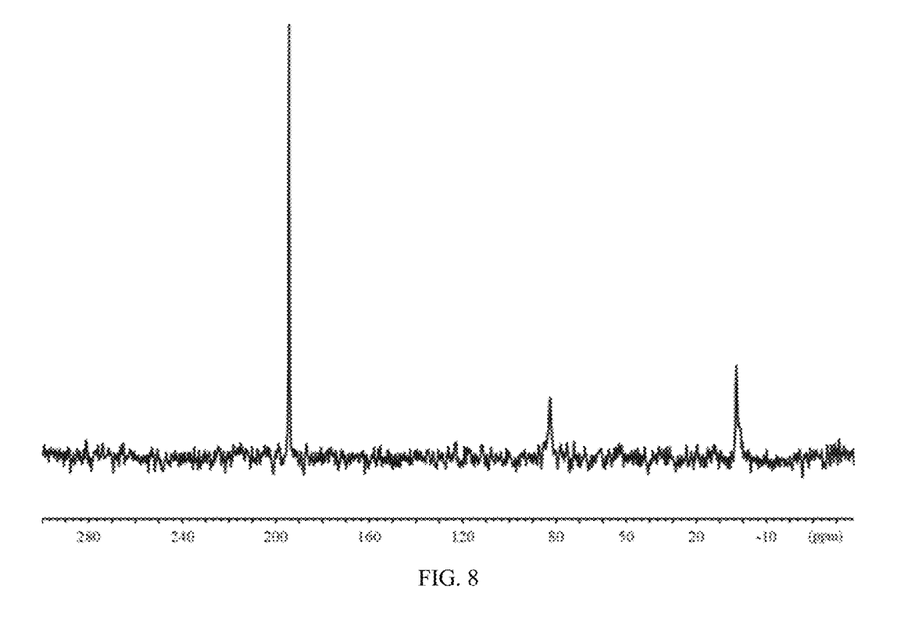
FIG. 8 shows a $^{129}$Xe spectrum of an interventional guidewire with a developing film layer for hyperpolarized $^{129}$Xe MRI in an Embodiment 4, obtained in fetal bovine serum.

The results of the $^{129}$Xe spectrum of the interventional guidewire in the fetal bovine serum in this embodiment are shown in FIG. 8. Three signals appeared in the $^{129}$Xe spectrum: one was attributed to dissolved $^{129}$Xe, with the chemical shift δ=194.3 ppm, one at 82.6 ppm was what the applicant wanted to obtain, i.e. the NMR signal of $^{129}$Xe@ZIF-8 generated by the ZIF-8 developing film layer capturing $^{129}$Xe molecules in the fetal bovine serum, and the last one at 2.9 ppm was caused by a few of bubbles produced by gas injection into the nuclear magnetic tube. The above results indicate that the interventional guidewire modified with the developing film layer for hyperpolarized $^{129}$Xe MRI can obtain the NMR signal of $^{129}$Xe@ZIF-8 in complex biological systems and has a high sensitivity to $^{129}$Xe.

The above provides a detailed description of the exemplary embodiments of the present invention. It should be understood that those skilled in the art can make many modifications and changes according to the concept of the present invention without creative efforts. Therefore, any technical solution that can be obtained by those skilled in the art according to the concept of the present invention through logical analysis, logical inference, or limited experiments on the basis of the prior art shall fall within the scope of protection determined by the claims.

What is claimed is:

1. A method for interventional guidewire development under hyperpolarized $^{129}$Xe magnetic resonance imaging (MRI) using a ZIF-8 film 小芸, comprising:
   capturing, using ZIF-8 in the ZIF-8 film, $^{129}$Xe inhaled into a human body, and generating a nuclear magnetic resonance signal of $^{129}$Xe@ZIF-8 to enable a development of the interventional guidewire under the hyperpolarized $^{129}$Xe MRI through computer data processing and image reconstruction,
   wherein the interventional guidewire is composed of a guidewire body, a cladding layer wrapped around a surface of the guidewire body, a Zn(II)-PDA modified layer adhered to a surface of the cladding layer, and a ZIF-8 developing film layer coated on the Zn(II)-PDA modified layer; the guidewire body is a core wire with magnetic compatibility; the ZIF-8 developing film layer is a continuous and dense ZIF-8 film with ZIF-8 particles fully covering a surface of the interventional guidewire.

2. An interventional guidewire with a ZIF-8 film 小芸 capable of development under hyperpolarized $^{129}$Xe MRI, wherein the interventional guidewire is composed of a guidewire body, a cladding layer wrapped around a surface of the guidewire body, a Zn(II)-PDA modified layer adhered to a surface of the cladding layer, and a ZIF-8 developing film layer coated on the Zn(II)-PDA modified layer; the guidewire body is a core wire with magnetic compatibility; and the ZIF-8 developing film layer is a continuous and dense ZIF-8 film with ZIF-8 particles fully covering a surface of the interventional guidewire, and the continuous and dense ZIF-8 film is used to capture 129Xe gas molecules and generate a nuclear magnetic resonance signal of $^{129}$Xe@ZIF-8 to enable the development of the interventional guidewire under the hyperpolarized $^{129}$Xe MRI through computer data processing and image reconstruction.

3. The interventional guidewire of claim 2, wherein the guidewire body is made of nickel-aluminum alloy, metallic titanium, ceramics, plastics, or composite materials; and the cladding layer is a layer of high molecular weight polymer, and the high molecular weight polymer is polytetrafluoroethylene, polyurethane, nylon, polylactic acid, or polyether ether ketone.

\* \* \* \* \*